(12) United States Patent
Hooper et al.

(10) Patent No.: US 9,578,818 B2
(45) Date of Patent: Feb. 28, 2017

(54) MODULAR RESERVOIR WICK

(71) Applicants: Wesley Hooper, North Vancouver (CA); Cooper Pantages, North Vancouver (CA)

(72) Inventors: Wesley Hooper, North Vancouver (CA); Cooper Pantages, North Vancouver (CA)

(*) Notice: Subject to any disclaimer, the term of this patent is extended or adjusted under 35 U.S.C. 154(b) by 37 days.

(21) Appl. No.: 14/456,974

(22) Filed: Aug. 11, 2014

(65) Prior Publication Data
US 2015/0040471 A1 Feb. 12, 2015

Related U.S. Application Data

(60) Provisional application No. 61/864,414, filed on Aug. 9, 2013.

(51) Int. Cl.
*A01G 27/04* (2006.01)
*A01G 27/00* (2006.01)

(52) U.S. Cl.
CPC .......... *A01G 27/04* (2013.01); *A01G 27/008* (2013.01)

(58) Field of Classification Search
CPC .............................. A01G 27/02; A01G 27/04
USPC ............... 47/48.5, 65.5, 66.5, 79–81; 52/509
See application file for complete search history.

(56) References Cited

U.S. PATENT DOCUMENTS

| 283,966 | A | | 8/1883 | Chappell | |
|---|---|---|---|---|---|
| 3,958,366 | A | * | 5/1976 | Meyers | A01G 27/04 47/81 |
| 4,109,415 | A | * | 8/1978 | Hall | A47G 7/04 211/113 |
| 4,991,346 | A | * | 2/1991 | Costa, Jr. | A01G 27/04 47/79 |
| 5,155,934 | A | * | 10/1992 | Leider | A01G 27/04 47/79 |
| 5,172,516 | A | * | 12/1992 | Maillefer | A01G 27/04 47/80 |
| 5,782,035 | A | * | 7/1998 | Locke | A01G 27/00 47/79 |
| 6,182,394 | B1 | * | 2/2001 | Bassler | A01G 27/06 47/65.5 |
| 6,672,007 | B1 | * | 1/2004 | Lai | A01G 27/02 47/79 |
| 6,843,021 | B1 | * | 1/2005 | Huang | A01G 9/00 47/60 |
| 8,608,401 | B2 | * | 12/2013 | Gooden | A01G 13/0237 404/40 |
| 2007/0130828 | A1 | * | 6/2007 | Mathy | A01G 1/007 47/65.9 |

(Continued)

FOREIGN PATENT DOCUMENTS

CA 2292302 6/2000

*Primary Examiner* — Danielle Clerkley
(74) *Attorney, Agent, or Firm* — Smiths IP; Lawrence Chan (57) ABSTRACT

A modular wick for accommodating garden beds of various sizes comprises a generally planar platform. Connectors are provided proximate to an outer edge of the platform that allow for connection with an adjacent wick. Each of the wick comprises at least one well that is filled with a wicking medium. Apertures are provided in the walls of the wells to allow water to enter into the wicking medium. By connecting the wicks together, various sizes can be formed.

20 Claims, 8 Drawing Sheets (56) References Cited

U.S. PATENT DOCUMENTS

2009/0260282 A1* 10/2009 Hashimoto ............ A01G 9/045
                                                                    47/20.1
2015/0033625 A1* 2/2015 Jawarski ................ A01G 27/02
                                                                    47/79

* cited by examiner

MODULAR RESERVOIR WICK

REFERENCE TO RELATED APPLICATIONS

This application claims the benefit of U.S. Provisional Patent Application No. 61/864,414 filed Aug. 9, 2013, the contents of which are hereby incorporated by reference.

FIELD OF INVENTION

The present invention relates to apparatuses for supplying water to a growing medium, more specifically to apparatuses for supplying water from an internal reservoir to a growing medium over an extended period of time.

BACKGROUND OF INVENTION

There are a number of different techniques for supplying plants with the necessary water to survive. More specifically, a number of techniques have been devised to assure that plants—whether in the ground, in pots, or in other containers—receive a continuous supply of water and that the time needed between waterings is maximized.

One such "self-watering" technique places the container holding the plant into a water reservoir for delivering the water in the reservoir to the growing medium of the plant. For example, U.S. Pat. No. 283,966 to Chappell discloses a planter with a tube that projects down into a water reservoir. The water then moves from the reservoir into the growing medium inside the tube, and continues up into the planter. However, both the reservoir and the planter must be of predesigned dimensions, limiting the scope of its utility.

More recently, Canadian Patent Application No. 2,292,302 to Buss discloses a water reservoir that is capable of being buried in the growing medium. A tube from the reservoir extends above the surface to allow the reservoir to be refilled. Water from the reservoir comes into contact with the growing medium through openings. This water passes into the growing medium. However, the size of the reservoir is limited to a predefined size.

Although the above techniques provide methods for supplying water continuously to a growing plant, these typically do so by including a reservoir in their design. They are not suitable for expanding in size to accommodate an increase in the size of the growing area.

Accordingly, a need exists for an improved system for supplying water to a growing medium that allows a reservoir to accommodate any size of growing area.

It is therefore an objective of the present invention to create an unobtrusive reservoir that is adaptable to a wide variety of water-holding vessels or areas intended for growing plants. It is another objective of this invention to provide a reservoir that can accommodate indefinite sizes.

SUMMARY OF THE INVENTION

The present invention provides a modular wick that is capable of being connected with other adjacent wicks to accommodate larger garden beds.

In one aspect of the invention, a wick for supplying water to a growing medium through a wicking medium and capable of connecting to an adjacent second wick comprises a generally planar platform for supporting the growing medium. The platform comprises an outer edge and one or more openings extending therethrough.

For each of the openings, one or more walls extend from the platform, with the walls forming a well for holding the wicking medium. The well has an interior in communication with the opening such that the interior is open to space above the platform. At least one of the walls comprises one or more apertures to permit contact of the water with the wicking medium.

One or more male connectors are arranged proximate to the outer edge. One or more female connectors are arranged proximate to the outer edge and are adapted for mating with corresponding male connectors on the adjacent second wick.

In another aspect of the invention, the platform is generally rectangular in shape.

In yet another aspect of the invention, the female connectors comprise slots. The male connectors comprise a projecting member and one or more tabs, The projecting member extends above the platform and beyond the outer edge. The tabs extend generally downwardly from the projecting member, with the tabs dimensioned to fit within the slots.

In a further aspect of the invention, the well is generally cylindrical.

In yet another aspect of the invention, at least a portion of a bottom of the well is open.

In another aspect of the invention, the apertures comprise slits.

In a further aspect of the invention, the wick also comprises one or more support members. The support members extend generally perpendicularly between a lower surface of the platform and an outer surface of the walls.

In yet a further aspect of the invention, the support members extend radially from the walls to the outer edge.

In another aspect of the invention, a system for supplying water to a growing medium through a wicking medium comprises a plurality of wicks. Each of the wicks comprises a generally planar platform. The platform comprises an outer edge and one or more openings extending therethrough. For each of the openings, one or more walls extend from the platform, with the walls forming a well for holding the wicking medium. The well has an interior in communication with the opening such that the interior is open is to space above the platform. At least one of the walls comprises one or more apertures to permit contact of the water with the wicking medium. One or more male connectors are arranged proximate to the outer edge. One or more female connectors are arranged proximate to the outer edge. The female connectors on a first one of the wicks are adapted for mating with corresponding male connectors on a second one of the wicks, thereby securing the platform of the first one of the wicks with the platform of the second one of the wicks.

In a further aspect of the invention, a system form supplying water to a growing medium through a wicking medium comprises a plurality of wicks. Each of the wicks comprises a generally planar platform. The platform comprises an outer edge and one or more openings extending therethrough. For each of the openings, one or more walls extend from the platform, with the walls forming a well for holding the wicking medium. The well has an interior in communication with the opening such that the interior is open to space above the platform. At least one of the walls comprises one or more apertures to permit contact of the water with the wicking medium. A plurality of legs extends generally downwardly from a lower surface of the platform, with the legs arranged proximate to the outer edge. The outer edge of a first one of the wicks is arranged adjacent to the outer edge of a second one of the wicks, Each of the wicks abuts at least another one of the wicks.

In yet a further aspect of the invention, the legs have a length that is at least equal to or greater than a height of the wells.

The foregoing was intended as a summary only and of only some of the aspects of the invention. It was not intended to define the limits or requirements of the invention. Other aspects of the invention will be appreciated by reference to the detailed description of the preferred embodiments, Moreover, this summary should be read as though the claims were incorporated herein for completeness.

BRIEF DESCRIPTION OF THE DRAWINGS

The preferred embodiment of the invention will be described by reference to the drawings thereof, in which.

DESCRIPTION OF THE PREFERRED EMBODIMENT

Referring to FIGS. 1 to 6, a wick 10 according to the present invention comprises a generally planar platform 20. One or more openings 30 are provided on the platform 20. In the embodiment shown in FIGS. 1 to 6, a single circular opening 30 is provided on the platform 20; however, multiple openings 30 of different shapes may also be provided, The opening 30 extends through the platform 20.

The opening 30 connects to a well 40 that is situated below the platform 20. The sides of the well 40 are defined by one or more walls 50 that extend from the platform 20. As a result, the interior of the well 40 extends through to the opening 30. In the embodiment shown in FIGS. 1 to 6, since the opening 30 is circular, the wall 50 that defines the sides of the well 40 comprises a single curved wall. It is to be understood that if, for example, the opening 30 was rectangular, then the walls 50 defining the sides of the well 40 would comprise four substantially planar walls.

Preferably, at least a portion of the bottom of the well 40 is open such that a continuous passageway way extends from the top to the bottom of the well 40, as shown in FIGS. 1 to 6. However, it is also possible that the bottom of the well 40 is closed.

Figure 7:
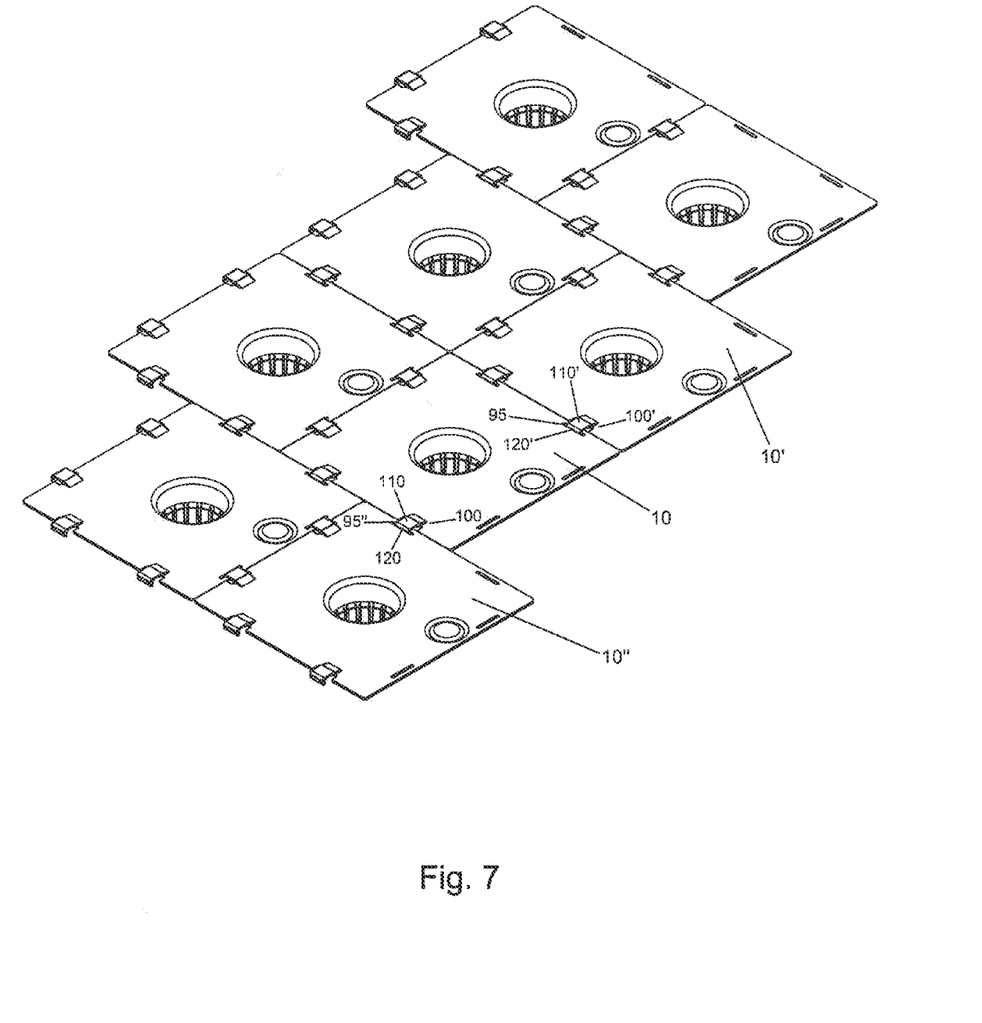
FIG. 7 is a top perspective view showing a number of wicks connected together.
Figure 8:
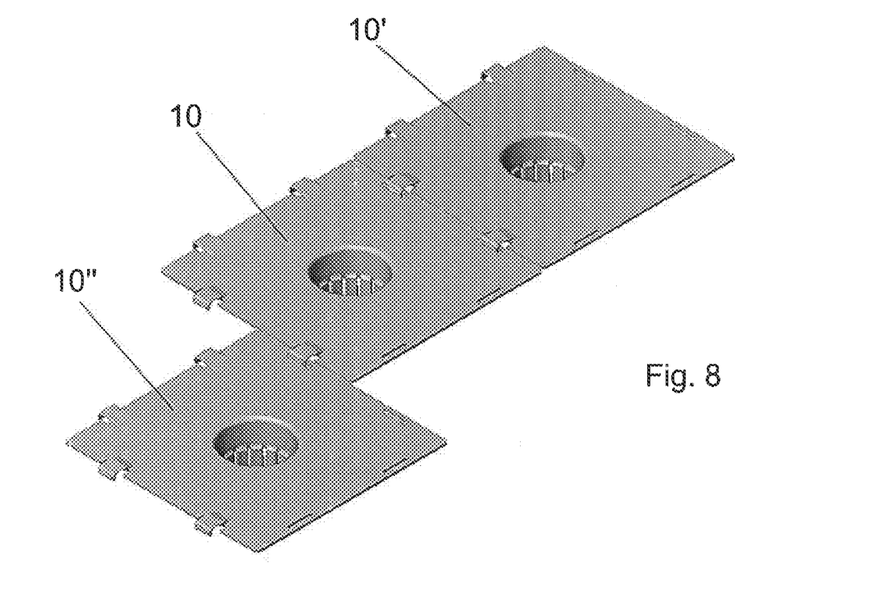
FIG. 8 is a top perspective view of three wicks connected together.
Figure 9:
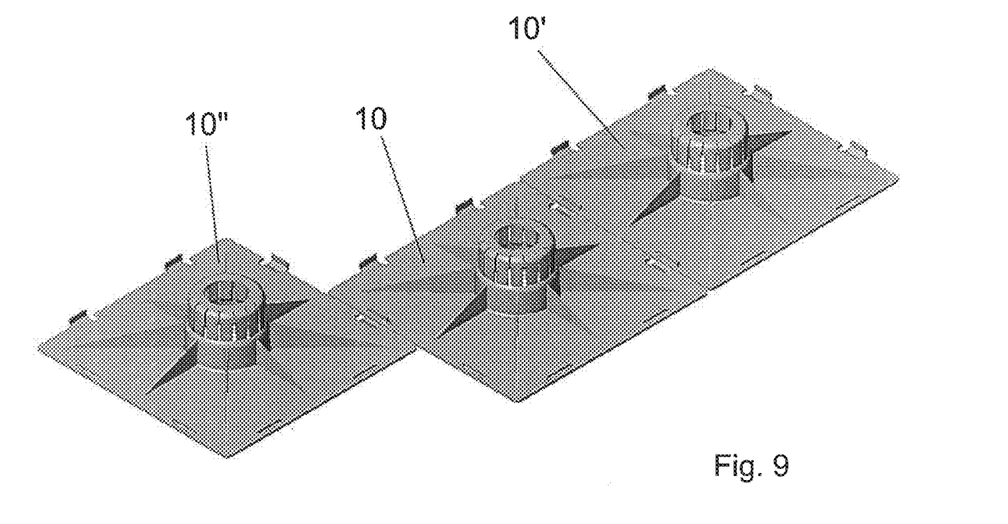
FIG. 9 is a bottom perspective view of the three wicks shown in FIG. 8.

The wall 50 preferably comprises one or more apertures 60. In the embodiment shown in FIGS. 1 to 6, the apertures 60 comprise slits that generally extend along the longitudinal axis of the well 40. However, the apertures 60 may be of other shapes, sizes, or orientations. For example, the apertures 60 may comprise perforations or other holes, The platform 20 also comprises an outer edge 70. Proximate to the outer edge 70 are provided a plurality of connectors. The connectors allow for the wick 10 to be attached to adjacent similar wicks 10', 10", as shown in FIGS. 7 to 9. Preferably, the connectors are of two types: female connectors 90 and male connectors 100. The terms "female" and "male" are used to denote that the female connectors 90 on the wick 10 are adapted to mate with the male connectors 100' of the adjacent wick 10', and vice versa.

Preferably, the wick 10 has at least one female connector 90 and at least one male connector 100.

In the embodiment shown in FIGS. 1 to 6, the platform 20 is substantially square in shape, resulting in the outer edge 70 comprising a first edge 72, a second edge 74, a third edge 76, and a fourth edge 78. However, it is to be understood that other shapes are also possible. For example, the platform 20 may be triangular, rectangular, or hexagonal in shape, as long as it is capable of allowing the wick 10 to be attached to other adjacent similar wicks 10', 10" to form a singular, substantially continuous, unit (e.g. as shown in FIG. 7).

The embodiment in FIGS. 1 to 6 shows the platform 20 having four female connectors 90 and four male connectors 100. Two female connectors 90 are located proximate to each of the first edge 72 and second edge 74, and two male connectors 100 are located proximate to each of the third edge 76 and fourth edge 78. It is to be understood that other arrangements and numbers of connectors 80 are also possible, although it is preferable that the number of female connectors 90 equal the number of male connectors 100.

The functioning of the female connectors 90 and the male connectors 100 will now be described with reference to FIGS. 1 to 9. In the embodiment shown in FIGS. 1 to 6, the female connectors 90 comprise slots 95 that extend generally parallel to the outer edge 70. The female connectors 100 comprise a projecting member 110 that extends above the platform 20 and beyond the outer edge 70. The projecting member 110 may be provided with some flexibility. At the end of the projecting member 110, a tab 120 extends generally downward. Since the projecting member 110 extends beyond the outer edge 70, the tab 120 also is situated beyond the outer edge 70.

The tab 120 is dimensioned to fit within the slot 95. When the wick 10 is positioned next to the adjacent similar wick 10' (as in FIGS. 7 to 9), the tabs 120' of the adjacent wick 10' will be aligned with the slots 95 of the wick 10. By sliding the tabs 120' of the adjacent wick 10' through the slots 95 of the wick 10, the wick 10 can be securely attached to the adjacent wick 10', Similarly, when the wick 10 is positioned next to the adjacent wick 10", the tabs 120 of the wick 10 will be aligned with the slots 95" of the adjacent wick 10". By sliding the tabs 120 of the wick 10 through the slots 95" of the adjacent wick 10", the wick 10 can be securely attached to the adjacent wick 10".

Although the embodiment of FIGS. 1 to 6 show the connectors as being of the tab-and-slot type, other type of connections are also possible.

In an alternate embodiment, a number of projecting members 110 may be combined together to form a longer extended projecting member 110. In this embodiment, instead of each tab 120 extending from a different projecting member 110, a number of tabs 120 would extend from a single projecting member 110 along various points along a length of the projecting member 110.

Figure 10:
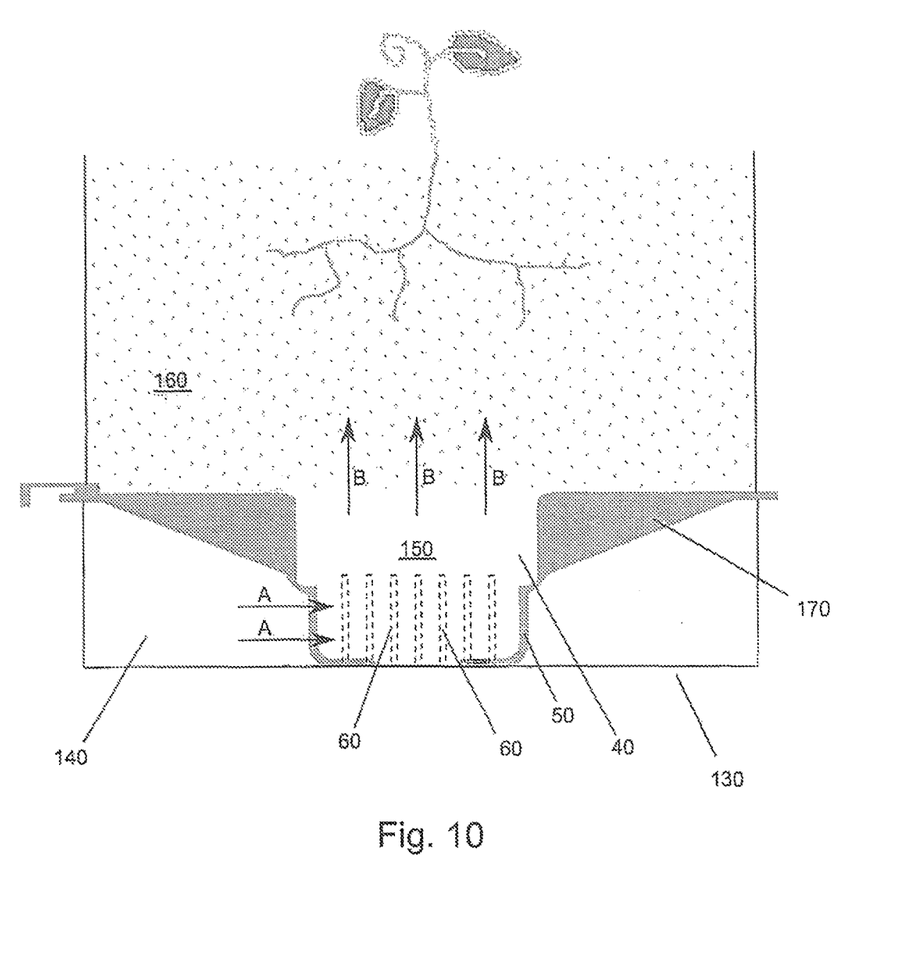
FIG. 10 is a cross-sectional view showing a wick in use.

The operation of the wick 10 will now be described with reference to FIGS. 10 and 11. When only one wick 10 is used (as in FIG. 10), the wick 10 is placed in or on a container 130 containing water to form a water reservoir 140, with the top of the reservoir 140 defined by the wick 10. A wicking medium 150 is placed within the interior of the well 40. The wicking medium 150 is preferably peat moss but may be any other suitable material, such as potting soil, coconut coir, clay beads, etc. The platform 20 acts to support a growing medium 160, such as soil. The growing medium 160 is in contact with the wicking medium 150 through the opening 30. The water within the container 130 may come in contact with the wicking medium 150 through the apertures 60. Through osmosis, wicking action, or some other water transfer mechanism, water within the container 130 enters into the wicking medium 150 in direction A through the apertures 60. Therefore, it is important that the size of the apertures 60 be sufficient to permit such water transfer.

Once the water enters into the wicking medium 150, the water travels up the wicking medium 150 in the well 40 through capillary action, Where the wicking medium. 150 interfaces with the growing medium 160 (i.e. at the opening 30), water enters into the growing medium 160 in direction B. In this manner, a continuous and steady supply of water from the container 130 is provided to the growing medium 160. Preferably, the well 40 is of sufficient size so that the water from the container 130 is able to saturate the wicking medium 150.

If it is necessary to accommodate. a larger area or if a larger size for the reservoir 140 is needed, a number of wicks 10 can be attached together as described above.

Figure 11:
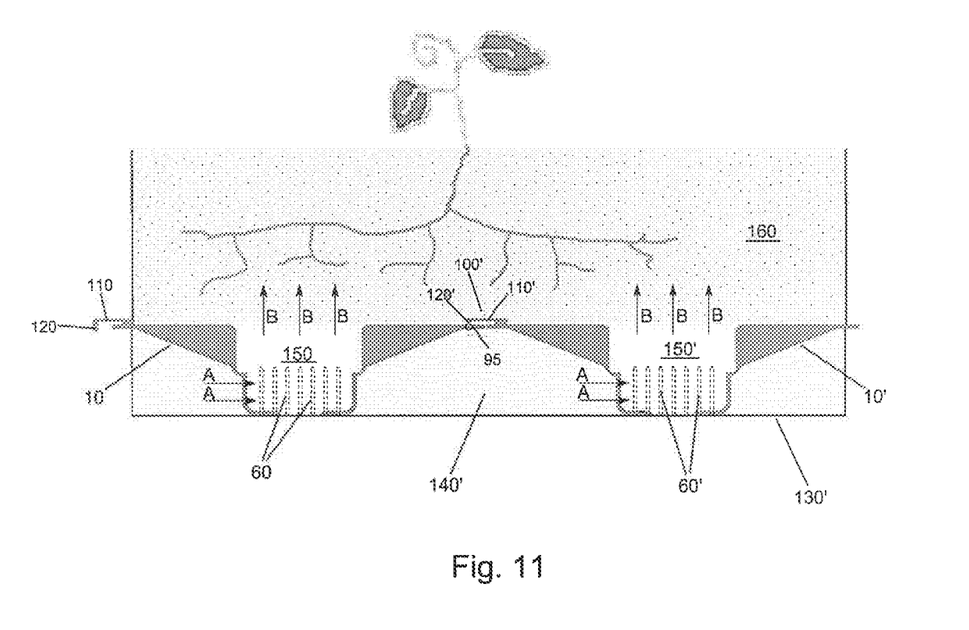
FIG. 11 is a cross-sectional view showing two connected wicks in use.

Referring to FIG. 11, two wicks 10, 10' have been attached together and placed in or on container 130' containing water to form reservoir 140'. Reservoir 140' would be approximately double the size of the reservoir 140. Water from the container 130' would enter into the wicking medium 150, 150' in direction A through the apertures 60, 60'. The water would then travel up the wicking medium 150, 150' and enter the growing medium 160 in direction 13.

The platform 20 must be of sufficient strength to support the weight of the growing medium 160. In one embodiment, the well 40 is of sufficient height such that is the bottom of the well 40 comes into contact with the bottom of the container 130. In this embodiment, the walls 50 help to support the weight of the growing medium 160 resting on the platform 20.

In another embodiment, support members 170 provide additional support for the platform 20. Referring to FIGS. 1 to 6, the support members 170 preferably extend between a lower surface of the platform 20 and an outer surface of the wall 50. The support members 170 extend generally perpendicularly to both the platform 20. Preferably, the support members 170 extend radially from the wall 50 towards the outer edge 70.

Preferably, the surface of the platform 20 also comprises a cutout portion 180. The cutout portion 180 may be removed from the platform 20 (i.e. by punching it out) to form a second opening. A tube may be inserted into the second opening to allow the water in the reservoir 140 to be refilled.

Figure 12:
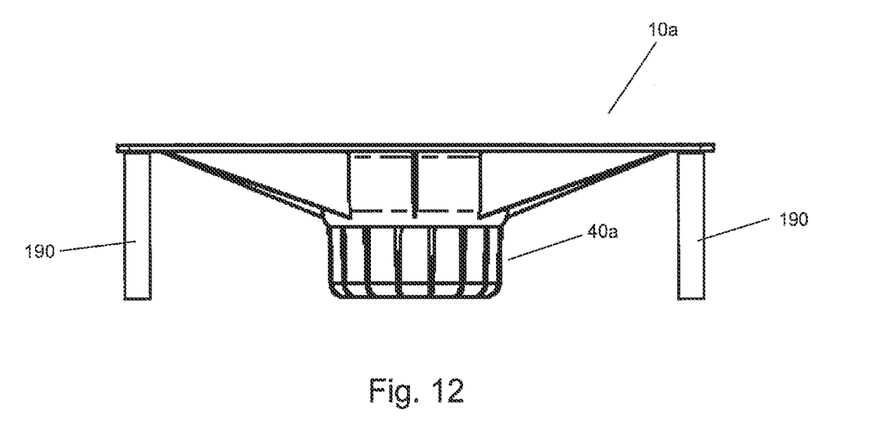
FIG. 12 is a side view of a second embodiment of the wick.
Figure 13:
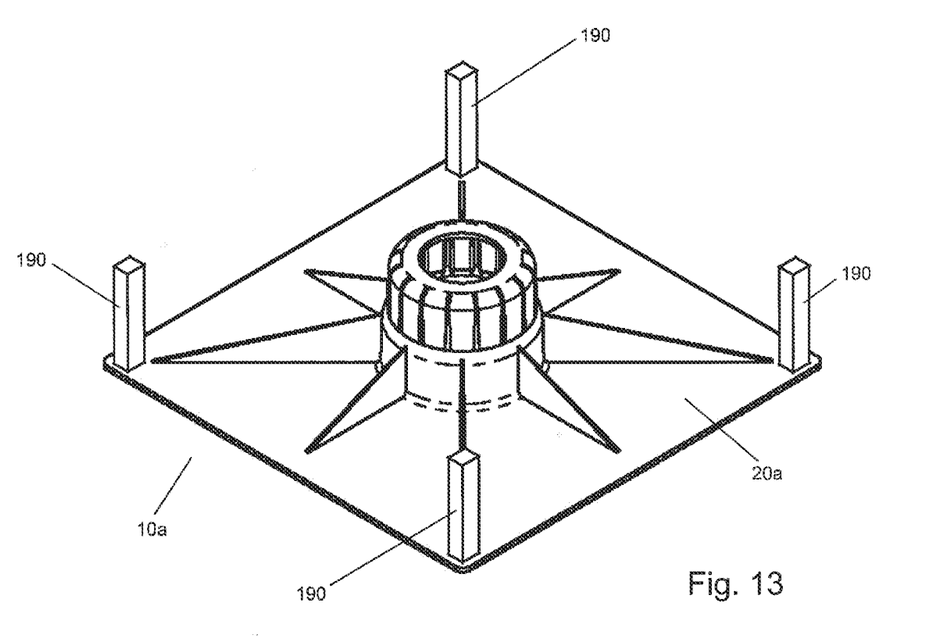
FIG. 13 is a bottom perspective view of the second embodiment of the wick shown in FIG. 12.

Referring to FIGS. 12 to 13, a second embodiment of the wick 10 is shown. In this embodiment, the female connectors 90 and the male connectors 100 are not present on the wick 10*a*. Instead, a plurality of legs 190 extends from a lower surface of the platform 20*a*. Preferably, the legs 190 have a length that is greater than or equal to the height of the well 40*a*. The wick 10*a* may be placed next to an adjacent similar wick 10*a* to form a continuous chain of wicks 10*a*.

Preferably, the wick 10 is formed from plastic injection molding; however, any other suitable material or procedure may also be used to form the wick 10.

Figure 1:
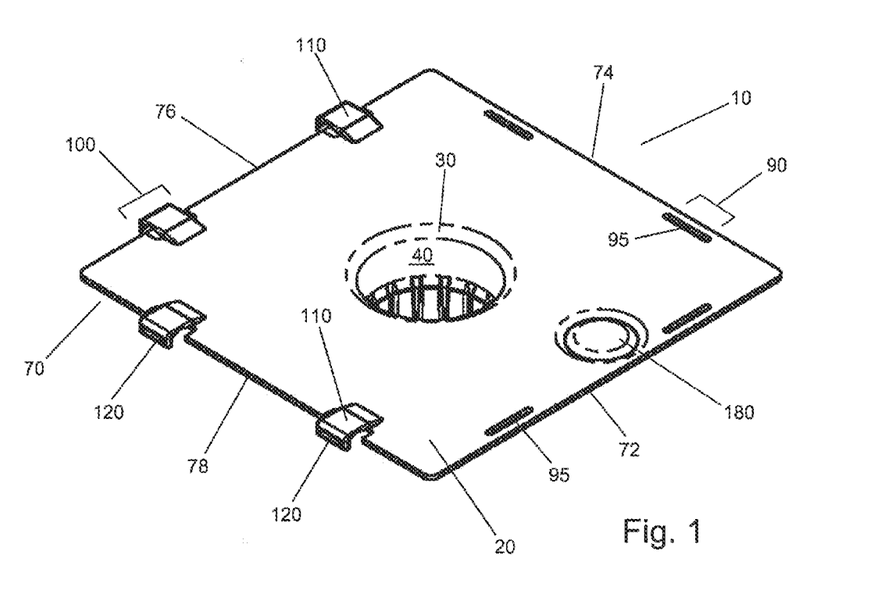
FIG. 1 is a top perspective view of the wick according to the invention.
Figure 2:
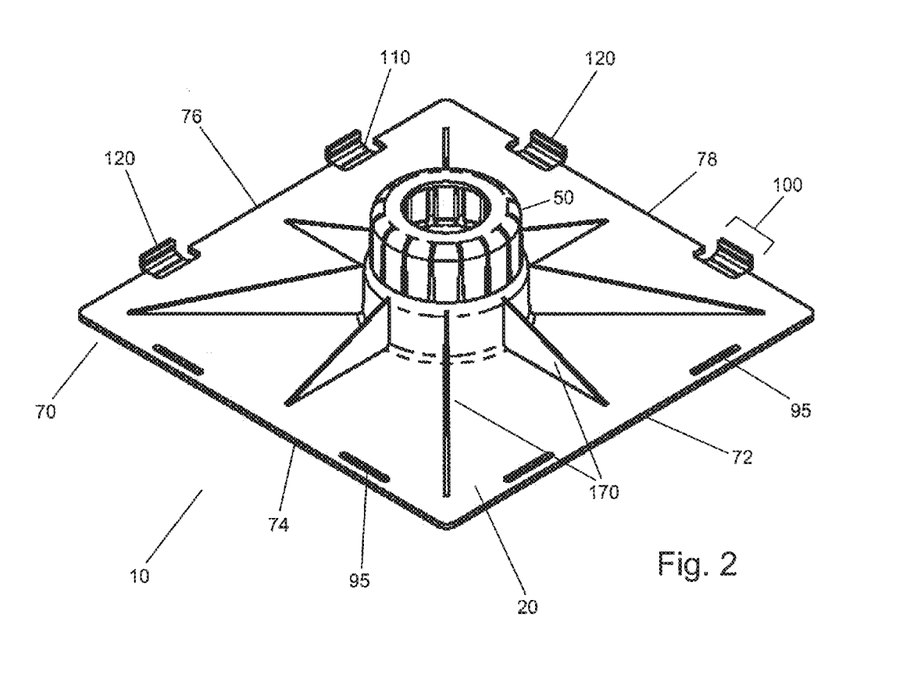
FIG. 2 is a bottom perspective view of the wick.
Figure 3:
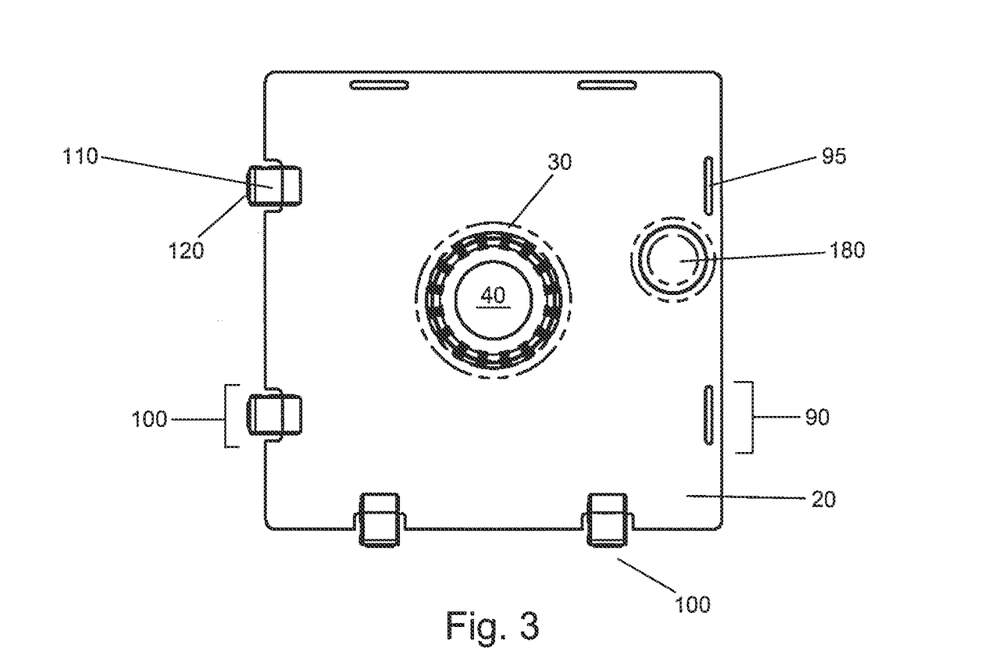
FIG. 3 is a top view of the wick.
Figure 4:
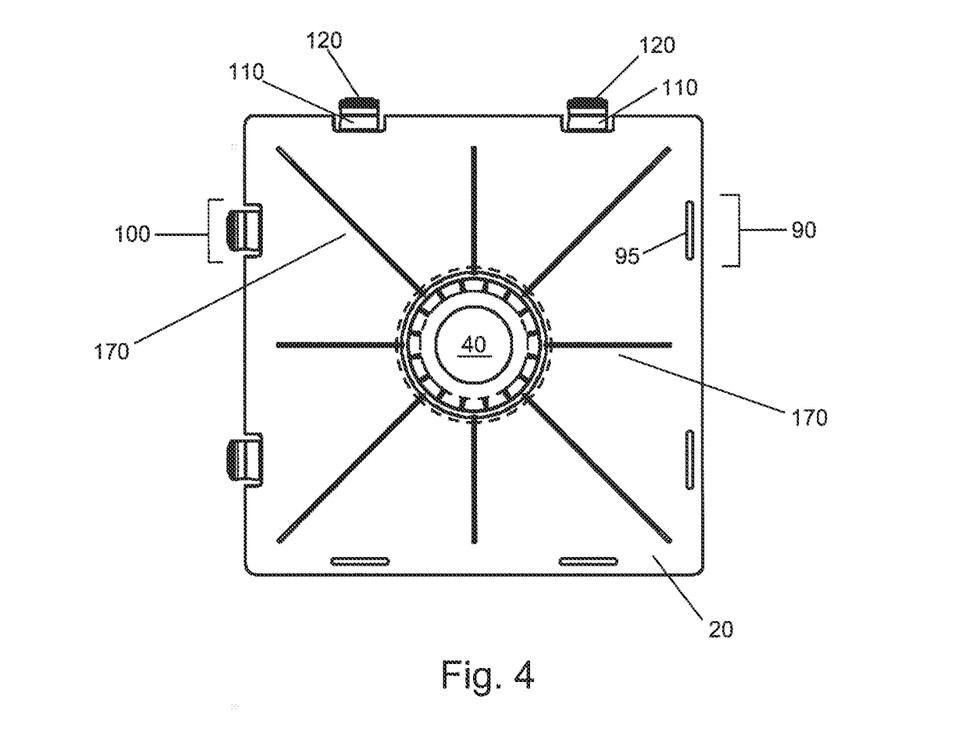
FIG. 4 is a bottom view of the wick.
Figure 5:
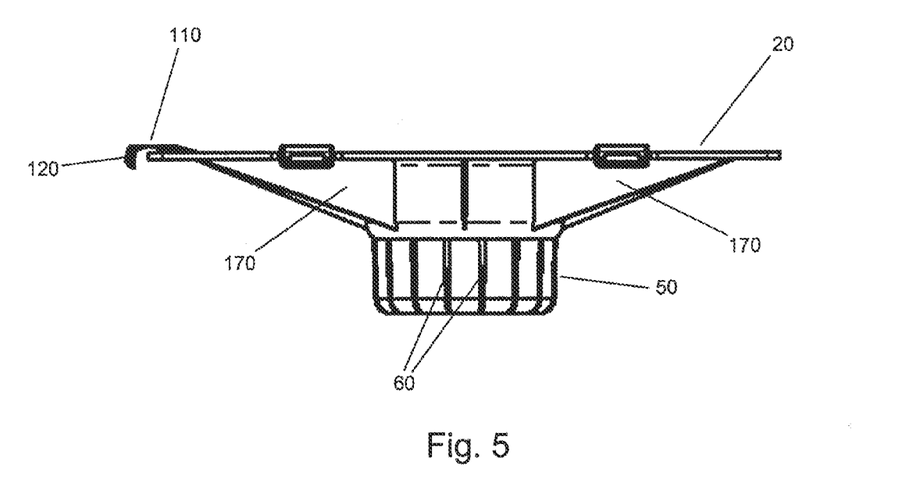
FIG. 5 is a side view of the wick.
Figure 6:
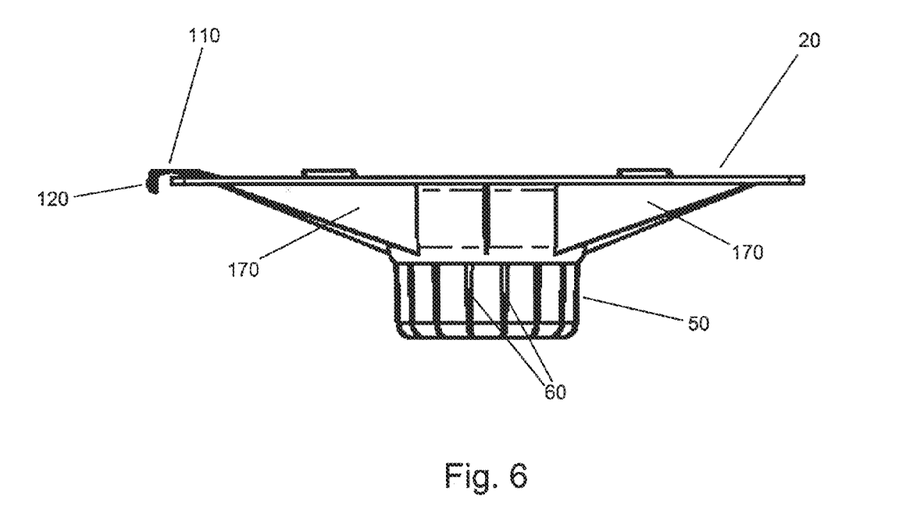
FIG. 6 is a second side view of the wick.

One possible use of the present invention is in the construction of a self-watering raised garden bed. For example, after building a watertight 4' wide×4' long×1' high raised garden box, an appropriate number wicks 10 can be connected together in order to is fit snuggly inside the box (similar to what is shown in FIG. 4) and placed inside the box.

For example, if the platforms 20 of the wicks 10 were each approximately 1'×1' units of the wicks 10 (arranged in a 4×4 square) may be used. As described before, the wells 40 may act as a support for the platforms 20. If, the wells 40 have a height of 4", then the reservoir 140 would have effective dimensions of approximately 4'×4'×4". The growing medium 160 may have a maximum height of approximately 8" (to fit within the total height of the garden box).

The modular nature of the wicks 10 allow for a variety of sizes and shapes of garden beds to be accommodated.

It will be appreciated by those skilled in the art that the preferred embodiment has been described in some detail but that certain modifications may be practiced without departing from the principles of the invention.

What is claimed:

1. A wick for supplying water to a growing medium and capable of connecting to an adjacent second wick, said wick comprising:
  a generally planar platform for supporting said growing medium, said platform comprising an outer edge and one or more openings extending therethrough;
  a wicking medium;
  for each of said openings, one or more sidewalls integral with and extending from said platform, said sidewalls generally defining a well holding said wicking medium, said well having an interior in communication with said opening, wherein said sidewalls are configured to be in contact with water; and wherein at least one of said sidewalls comprises one or more apertures to permit movement of said water into said wicking medium;
  one or more male connectors formed on said platform and arranged proximate to said outer edge; and
  one or more female connectors formed on said platform and arranged proximate to said outer edge, wherein said female connectors are adapted for mating with corresponding male connectors on said adjacent second wick;
  wherein said wicking medium facilitates movement of water into said growing medium.

2. The wick of claim 1, wherein said platform is generally rectangular in shape.

3. The wick of claim 1, wherein said female connectors comprise slots.

4. The wick of claim 3, wherein said male connectors comprise:
  a projecting member extending above said platform and beyond said outer edge; and
  one or more tabs extending generally downwardly from said projecting member, said tab dimensioned to fit within said slot.

5. The wick of claim 1, wherein said well is generally cylindrical.

6. The wick of claim 1, wherein at least a portion of a bottom of said well is open.

7. The wick of claim 1, wherein said apertures comprise slits.

8. The wick of claim 1, further comprising one or more support members, said support members extending generally perpendicularly between a lower surface of said platform and an outer surface of said sidewalls.

9. The wick of claim 8, wherein said support members extend radially from said sidewalls to said outer edge.

10. A system for supplying water to a growing medium, said system comprising:
- a plurality of wicks, each of said wicks comprising:
- a generally planar platform for supporting said growing medium, said platform comprising an outer edge and one or more openings extending therethrough;
- a wicking medium;
- for each of said openings, one or more sidewalls integral with and extending from said platform, said sidewalls generally defining a well holding said wicking medium, said well having an interior in communication with said opening, wherein said sidewalls are configured to be in contact with water; and wherein at least one of said sidewalls comprises one or more apertures to permit movement of said water into said wicking medium;
- one or more male connectors formed on said platform and arranged proximate to said outer edge; and
- one or more female connectors formed on said platform and arranged proximate to said outer edge;
- wherein said female connectors on a first one of said wicks are adapted for mating with corresponding male connectors on a second one of said wicks, thereby securing said platform of said first one of said wicks with said platform of said second one of said wicks;
- wherein said wicking medium facilitates movement of said water into said growing medium.

11. The system of claim 10, wherein said platform is generally rectangular in shape.

12. The system of claim 10, wherein said female connectors comprise slots.

13. The system of claim 12, wherein said male connectors comprise:
- a projecting member extending above said platform and beyond said outer edge; and
- one or more tabs extending generally downwardly from said projecting member, said tab dimensioned to fit within said slot.

14. The system of claim 10, wherein said well is generally cylindrical.

15. The system of claim 10, wherein at least a portion of a bottom of said well is open.

16. The system of claim 10, wherein said apertures comprises slits.

17. The system of claim 10, wherein each of said wicks further comprises one or more support members, said support members extending generally perpendicularly between a lower surface of said platform and an outer surface of said sidewalls.

18. The system of claim 17, wherein said support members extend radially from said sidewalls to said outer edge.

19. A system for supplying water to a growing medium, said system comprising:
- a plurality of wicks, each of said wicks comprising:
- a generally planar platform for supporting said growing medium, said platform comprising an outer edge and one or more openings extending therethrough;
- a wicking medium;
- for each of said openings, one or more sidewalls integral with and extending from said platform, said sidewalls generally defining a well holding said wicking medium, said well having an interior in communication with said opening, wherein said sidewalls are configured to be in contact with water; and wherein at least one of said sidewalls comprises one or more apertures to permit movement of said water into said wicking medium; and
- a plurality of legs extending generally downwardly from a lower surface of said platform, said legs arranged proximate to said outer edge;
- wherein said wicking medium facilitates movement of water into said growing medium;
- wherein said outer edge of a first one of said wicks is arranged adjacent to said outer edge of a second one of said wicks; and
- wherein each of said wicks abuts at least another one of said wicks.

20. The system of claim 19, wherein said legs have a length that is at least equal to or greater than a height of said wells.

* * * * *